(12) United States Patent
Hernandez-Zelaya

(10) Patent No.: US 12,492,840 B1
(45) Date of Patent: Dec. 9, 2025

(54) AIR CONDITIONER SHUTOFF SWITCH AND FLUSH SYSTEM

(71) Applicant: Rodolfo Hernandez-Zelaya, Tampa, FL (US)

(72) Inventor: Rodolfo Hernandez-Zelaya, Tampa, FL (US)

( * ) Notice: Subject to any disclaimer, the term of this patent is extended or adjusted under 35 U.S.C. 154(b) by 0 days.

(21) Appl. No.: 19/238,374

(22) Filed: Jun. 14, 2025

Related U.S. Application Data

(62) Division of application No. 18/371,671, filed on Sep. 22, 2023, now Pat. No. 12,331,954.

(51) Int. Cl.
 *F24F 11/88* (2018.01)
 *F24F 13/22* (2006.01)

(52) U.S. Cl.
 CPC ............ *F24F 13/222* (2013.01); *F24F 11/88* (2018.01)

(58) Field of Classification Search
 CPC ........... H05K 7/20154; H05K 7/20418; H05K 7/20863; B60H 1/00671; B60H 1/00328
 See application file for complete search history.

(56) References Cited

U.S. PATENT DOCUMENTS

| | | | |
|---|---|---|---|
| 2,367,305 A | 1/1945 | Newton | |
| 6,442,955 B1 | 9/2002 | Oakner | |
| 7,624,756 B1 * | 12/2009 | Coogle | F28F 17/005 137/271 |
| 9,217,577 B2 * | 12/2015 | Oakner | F16L 45/00 |
| 9,359,750 B1 * | 6/2016 | Perez | F15D 1/02 |
| 2021/0041138 A1 * | 2/2021 | Rechlin | F24F 13/222 |

* cited by examiner

*Primary Examiner* — Joel M Attey
*Assistant Examiner* — Meraj A Shaikh
(74) *Attorney, Agent, or Firm* — Edward P Dutkiewicz

(57) ABSTRACT

An inflow tube having a passageway there through. A main body having a through-housing chamber therein, and an intake tube. A cap coupled to the main body with the cap having a downwardly disposed closed end tube. An electronic end piece having a circuit portion is nested in the downwardly disposed closed end tube of the cap. A flush pipe having a passageway running there through. A pressure fitting coupled to the flush pipe. Lastly, a flush container having an open and close valve.

10 Claims, 8 Drawing Sheets

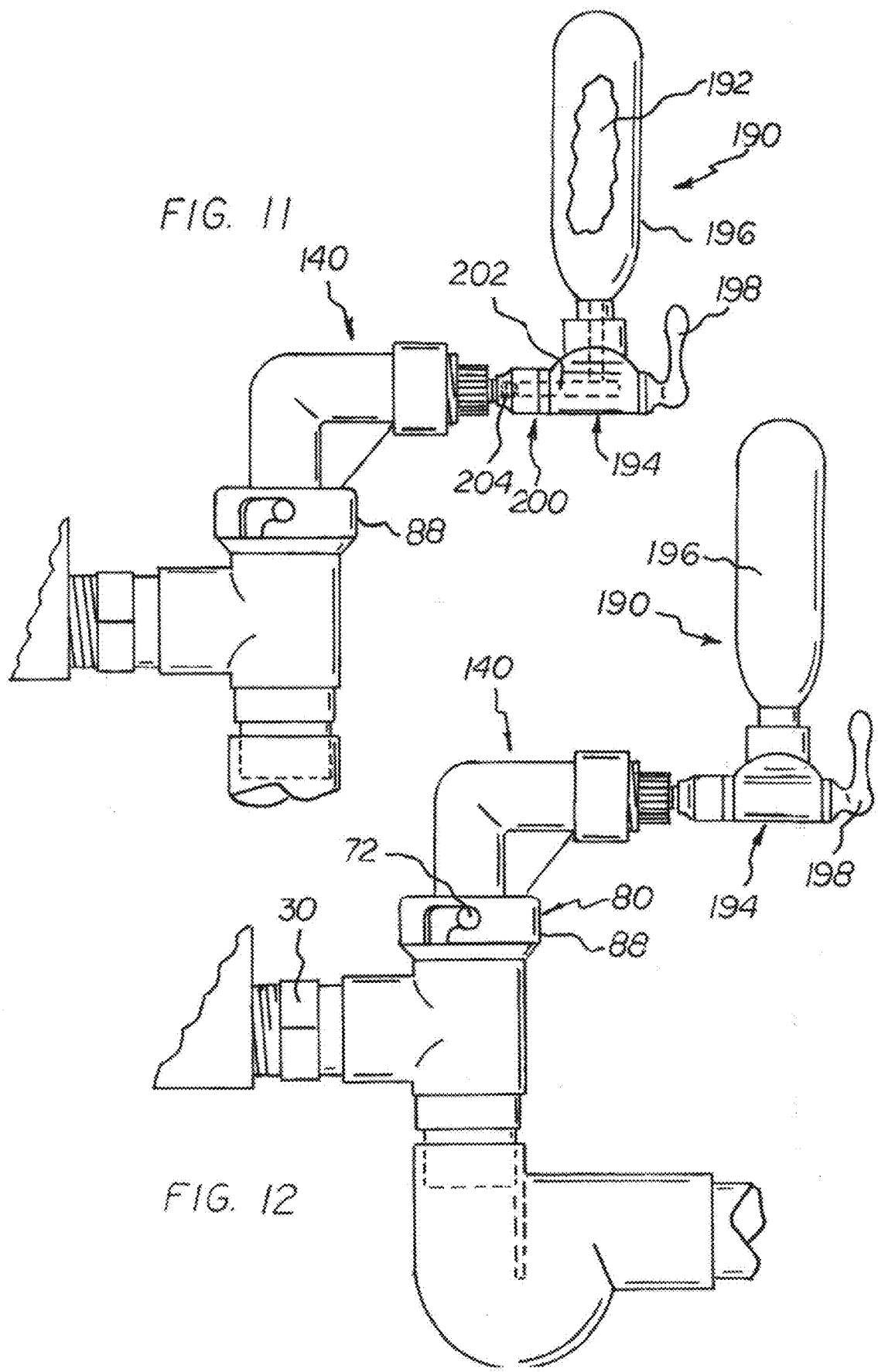

AIR CONDITIONER SHUTOFF SWITCH AND FLUSH SYSTEM

BACKGROUND OF THE INVENTION

Rule 1.78 (F) (1) Disclosure

The Applicant has submitted a related pending or patented non-provisional application within two months of the filing date of this present application. The invention is made by a single inventor, so there are no other inventors to be disclosed. This application is not under assignment to any other person or entity at this time.

This application is a divisional application of a currently pending patent application, bearing Ser. No. 18/371,671, filed on Sep. 22, 2023, which is a continuation in part of a current utility patent, bearing Ser. No. 11/946,237, issued on Apr. 2, 2024. The Applicant claims priority to the above referenced existing, pending application.

There are no cross referenced or related applications which are direct to, or related to, the present application.

There is no research of development of this application which is federally sponsored.

FIELD OF THE INVENTION

The present invention relates to an air conditioner shutoff switch and flush system and more particularly pertains to a shutoff switch and flush system for an air conditioning system.

DESCRIPTION OF THE PRIOR ART

The use of an air conditioner shut off switch is known in the prior art. More specifically, air conditioner shut off switches, previously devised and utilized for the purpose of providing for a shut off switch for an air conditioner are known to consist basically of familiar, expected, and obvious structural configurations, notwithstanding the number of designs encompassed by the prior art which has been developed for the fulfillment of countless objectives and requirements.

While the prior art devices fulfill their respective, particular objectives and requirements, the prior art does not describe air conditioner shutoff switch and flush system that allows both a shut off function and a flush function of an air conditioner unit.

In this respect, the air conditioner shutoff switch and flush system according to the present invention substantially departs from the conventional concepts and designs of the prior art, and in doing so provides an apparatus primarily developed for the purpose of a shutoff switch and flush system for an air conditioning unit.

Therefore, it can be appreciated that there exists a continuing need for a new and improved air conditioner shutoff switch and flush system which can be used for preventing and correcting water drain pan overflow of an air conditioning unit. In this regard, the present invention substantially fulfills this need.

SUMMARY OF THE INVENTION

In view of the foregoing disadvantages inherent in the known types of air conditioner shut off switches, now present in the prior art, the present invention provides an improved air conditioner shutoff switch and flush system. As such, the general purpose of the present invention, which will be described subsequently in greater detail, is to provide a new and improved air conditioner shutoff switch and flush system which has all the advantages of the prior art and none of the disadvantages.

In describing this invention, the word "coupled" is used. By "coupled" is meant that the article or structure referred to is joined, either directly, or indirectly, to another article or structure. By "indirectly joined" is meant that there may be an intervening article or structure imposed between the two articles which are "coupled". "Directly joined" means that the two articles or structures are in contact with one another or are essentially continuous with one another.

In describing aspects of the invention, the word "generally" may be used. The term, "generally" when used to describe a configuration means that the configuration includes those aspects which are within normal manufacturing parameters of acceptance. By way of example, the term "generally round" may be used. This should be interpreted to mean that the configuration may be perfectly round, but may also have a radius which is not exact, but is within the manufacturing parameters. For example, a basketball may be generally round, but not be perfectly round.

By adjacent to a structure is meant that the location is near the identified structure.

To attain this, the present invention essentially comprises an air conditioner shutoff switch and flush system comprising several components, in combination.

There is an inflow tube. The inflow tube is fabricated of a rigid material such as a plastic or metal. The inflow tube has a circumferential wall with an inner surface and an outer surface. The inner surface of the inflow tube forms a passageway through the inflow tube. The inflow tube has a proximal end and a distal end, with a length there between. The proximal end of the inflow tube has a first external diameter. The length of the inflow tube has a hexagonal configuration.

There is a main body. The main body is fabricated of a rigid material such as plastic or metal. The main body has an upper end and a lower end, with a length there between. The main body has an internal surface and an external surface with a thickness there between.

The internal surface of the main body forms a through-housing chamber therein. The through-housing chamber has an open upper extent and an open lower extent. The length of the main body has an outwardly projecting intake tube. The intake tube of the main body has a proximal end and a distal end, with a length there between. The intake tube of the main body has an internal surface and an external surface, with a thickness there between. The external surface comprises a round surface. The internal surface of the main body intake tube has a first internal diameter, with the first internal diameter of the intake tube of the main body being greater than the first external diameter of the distal end of the inflow tube, thereby allowing the distal end of the inflow tube to be slidably received into the proximal end of the intake tube of the main body.

The upper end of the main body has a cap receiving portion. The cap receiving portion has an uppermost opening into the main body. The cap receiving portion of the upper end of the main body has an external flange. The external surface of the main body cap receiving portion has at least one locking lug projecting there from.

There is a cap. The cap is fabricated of a rigid material, such as plastic or metal. The cap has a top extent with an external surface and an internal surface, with a thickness there between. The cap top extent has a tube hole there through.

The cap has a downwardly projecting side wall. The downwardly projecting side wall of the cap has an internal surface and an external surface, with a thickness there between. The downwardly projecting side wall of the cap has at least one locking lug slot there through. The at least one locking lug slot is configured to rotatably receive the at least one locking lug of the upper end of the main body.

There is a downwardly disposed closed end tube. The downwardly disposed closed end tube has a stepped configuration with an open uppermost extent and a closed lowermost extent. The downwardly disposed closed end tube is operatively coupled to the cap top extent tube hole.

The top extent of the cap has an internal surface and an external surface, with a thickness there between. The downwardly disposed closed end tube of the top extent of the cap has an upper section having a second external diameter. The downwardly disposed closed end tube of the top extent of the cap has a lower section having a third external diameter. The second external diameter is greater than the third external diameter.

The lower section of the downwardly disposed closed end tube of the top extent of the cap has an associated slideable float located there around. The slideable float has an internal position indicator. The lower section of the downwardly disposed passageway of the top extent of the cap has a lowermost extent with an associated float keeper.

The downwardly disposed closed end tube is removeably coupled to the cap, so as to allow the circuitry and float to be removed.

There is an electronic end piece. The electronic end piece has a circuit portion coupled electronically to a wire. The wire passes from the circuit portion through the end piece. The circuit portion has a float position sensing component. The electronic end piece is coupled to the cap top extent. The circuit portion of the electronic end piece is housed within the downwardly disposed closed end tube of the top extent of the cap.

There is a flush pipe. The flush pipe is fabricated of a rigid material, such as plastic or metal. The flush pipe has an internal surface with a second internal diameter and an external surface with a fourth external diameter. The flush pipe has an open lower extent and an open upper extent.

The flush pipe has a passageway running there through, from the open upper extent to the open lower extent. The flush pipe upper extent has a collar with a third internal diameter female thread. The third internal diameter is greater than the second internal diameter. The third internal diameter of the collar of the upper extent of the flush pipe having an internal female thread.

The flush pipe is removeably coupled to the cap, which allows the cap to be coupled to the downwardly disposed closed end tube or the flush pipe.

There is a pressure fitting. The pressure fitting has an o-ring, a connector, and an end seal. The connector has a stepped configuration with a distal threaded portion. The distal threaded portion of the connector has a thread with a fifth external diameter. The fifth external diameter male thread of the connector is less than the third internal diameter of the flush pipe. The fifth internal diameter male thread of the connector is sized to be threadedly mated with, and received by, the third internal diameter female thread of the collar of the upper extent of the flush pipe.

The connector has a proximal portion and an intermediate portion. The proximal portion has an external male thread. The external male thread of the proximal portion of the connector has a sixth external diameter. The intermediate portion is continuous with the proximal portion of the connector and the distal portion of the connector. The sixth external diameter male thread of the proximal portion is less than fifth external diameter male thread of the distal portion of the connector.

The pressure fitting end seal has a distal portion and a proximal portion. The distal portion of the pressure fitting end seal has a fourth internal diameter with a female thread. The fourth internal diameter is greater than the sixth external diameter of the connector proximal portion. The proximal portion of the pressure fitting end seal is closed. The pressure fitting is removeably coupled to the flush pipe.

Lastly, there is a flush container. The flush container has an internal compartment. The flush container has a valve portion and a containment portion. The containment portion has a chamber therein. The valve portion has an open and close valve. The valve portion has a distal portion, with the distal portion having a passageway there through. The passageway of the valve portion of the flush container is continuous with the containment portion chamber. The distal portion of the valve portion has a female thread.

The valve portion has a proximal portion and an intermediate portion. The female thread of the distal portion of the valve portion of the flush container has the fourth internal diameter with a female thread thereby allowing the valve portion of the flush container to be threadedly mated with and received by the male thread of the proximal portion of the connector.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved air conditioner shutoff switch and flush system which has all of the advantages of the prior art air conditioner flush systems and none of the disadvantages.

It is another object of the present invention to provide a new and improved air conditioner shutoff switch and flush system which may be easily and efficiently manufactured and marketed.

It is further object of the present invention to provide a new and improved air conditioner shutoff switch and flush system which is of durable and reliable constructions.

An even further object of the present invention is to provide a new and improved air conditioner shutoff switch and flush system which is susceptible of a low cost of manufacture with regard to both materials and labor, and which accordingly is then susceptible of low prices of sale to the consuming public, thereby making such air conditioner shutoff switch and flush system economically available to the buying public.

Even still another object of the present invention is to provide an air conditioner shutoff switch and flush system for providing an inclusive shutoff switch and flush device as a complete system for an air conditioning unit.

Lastly, it is an object of the present invention to provide a new and improved air conditioner shut off and flush system which has an inflow tube having a passageway there through. A main body having a through-housing chamber therein, and an intake tube. A cap coupled to the main body with the cap having a downwardly disposed closed end tube. An electronic end piece having a circuit portion is nested in the downwardly disposed closed end tube of the cap. A flush pipe having a passageway running there through. A pressure fitting coupled to the flush pipe. Lastly, a flush container having an open and close valve.

It should be understood that while the above-stated objects are goals which are sought to be achieved, such objects should not be construed as limiting or diminishing the scope of the claims herein made.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 11 is a side elevational view of the pressurized gas flush configuration of the system.

FIG. 12 is a side elevational view of the pressurized gas flush configuration of the system when used with a P-trap drain fitting.

The same reference numerals refer to the same parts throughout the various Figures.

DESCRIPTION OF THE PREFERRED EMBODIMENT

Figure 1:
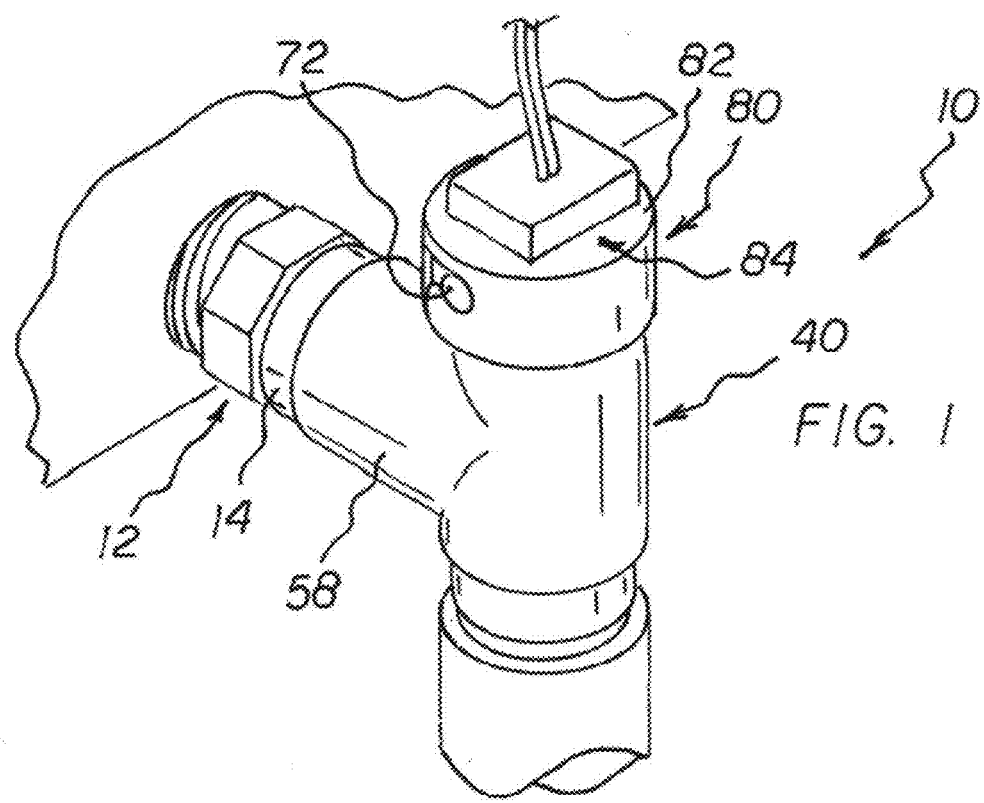
FIG. 1 is a top perspective view of my air conditioner shutoff switch and flush system.
Figure 2:
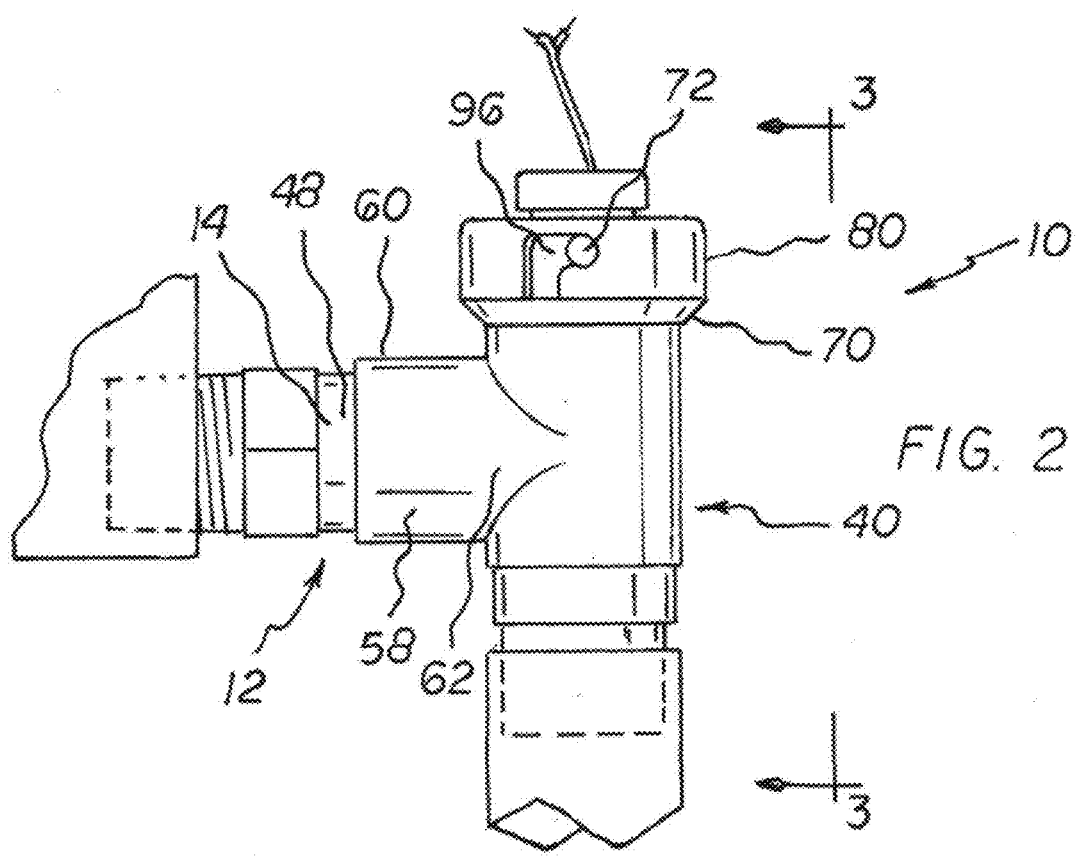
FIG. 2 is a side elevational view thereof.
Figure 3:
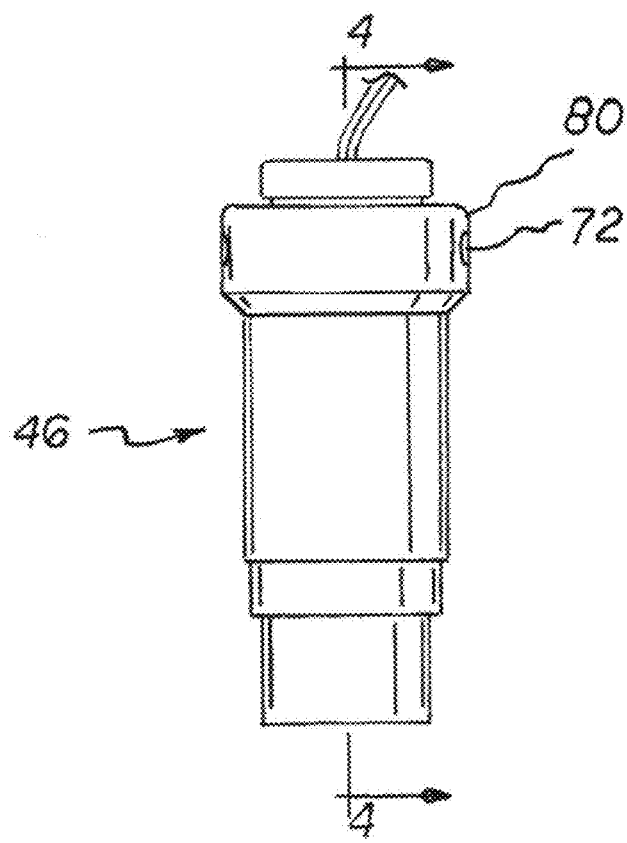
FIG. 3 is a view taken along line 3-3 of FIG. 2.
Figure 4:
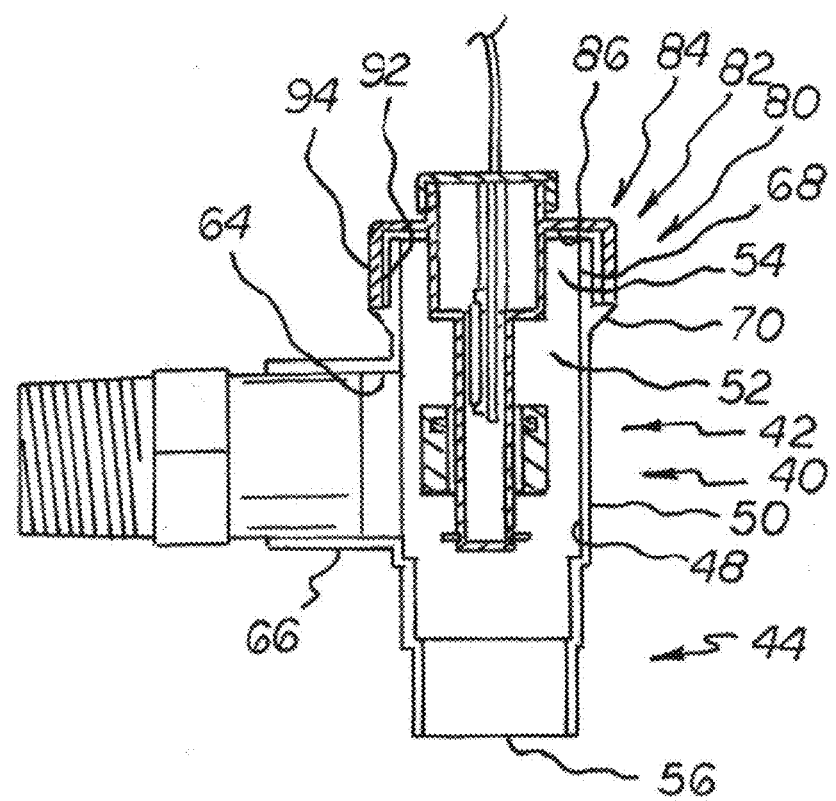
FIG. 4 is view taken along line 4-4 of FIG. 3.
Figure 5:
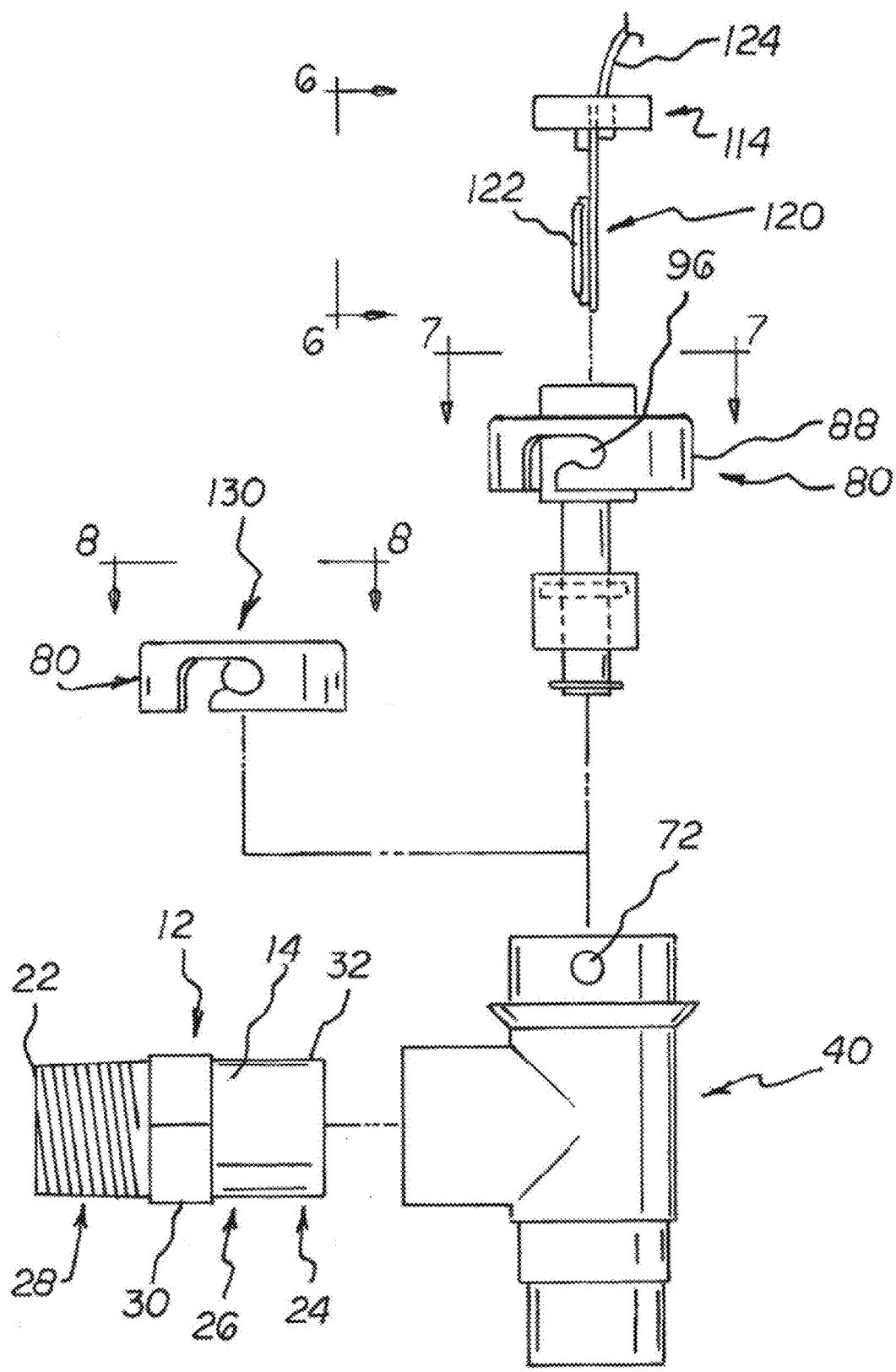
FIG. 5 is an exploded view of the components of the system.
Figure 6:
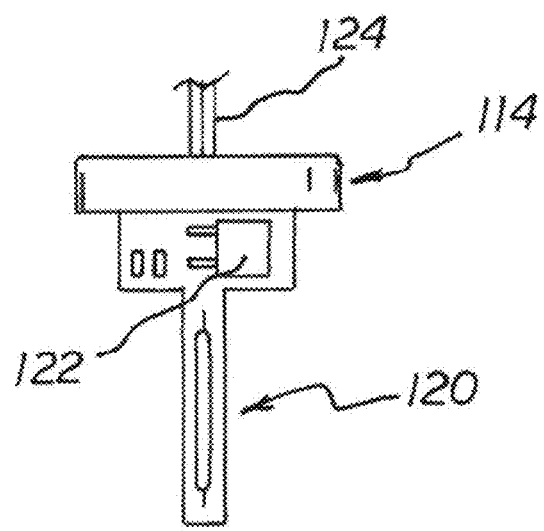
FIG. 6 is view taken along line 6-6 of FIG. 5.
Figure 7:
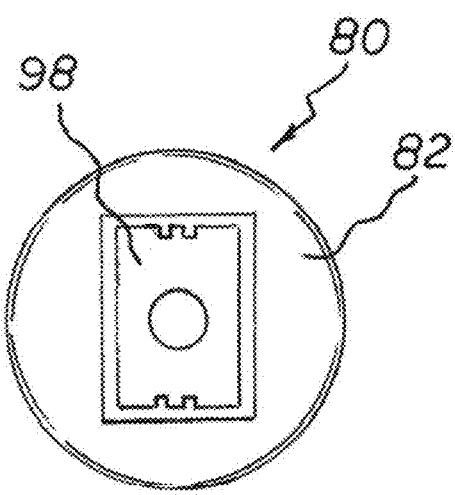
FIG. 7 is a view taken along line 7-7 of FIG. 5.
Figure 8:
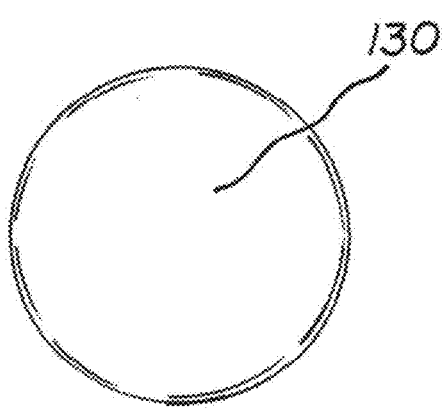
FIG. 8 is view taken along line 8-8 of FIG. 5.
Figures 9, 10:
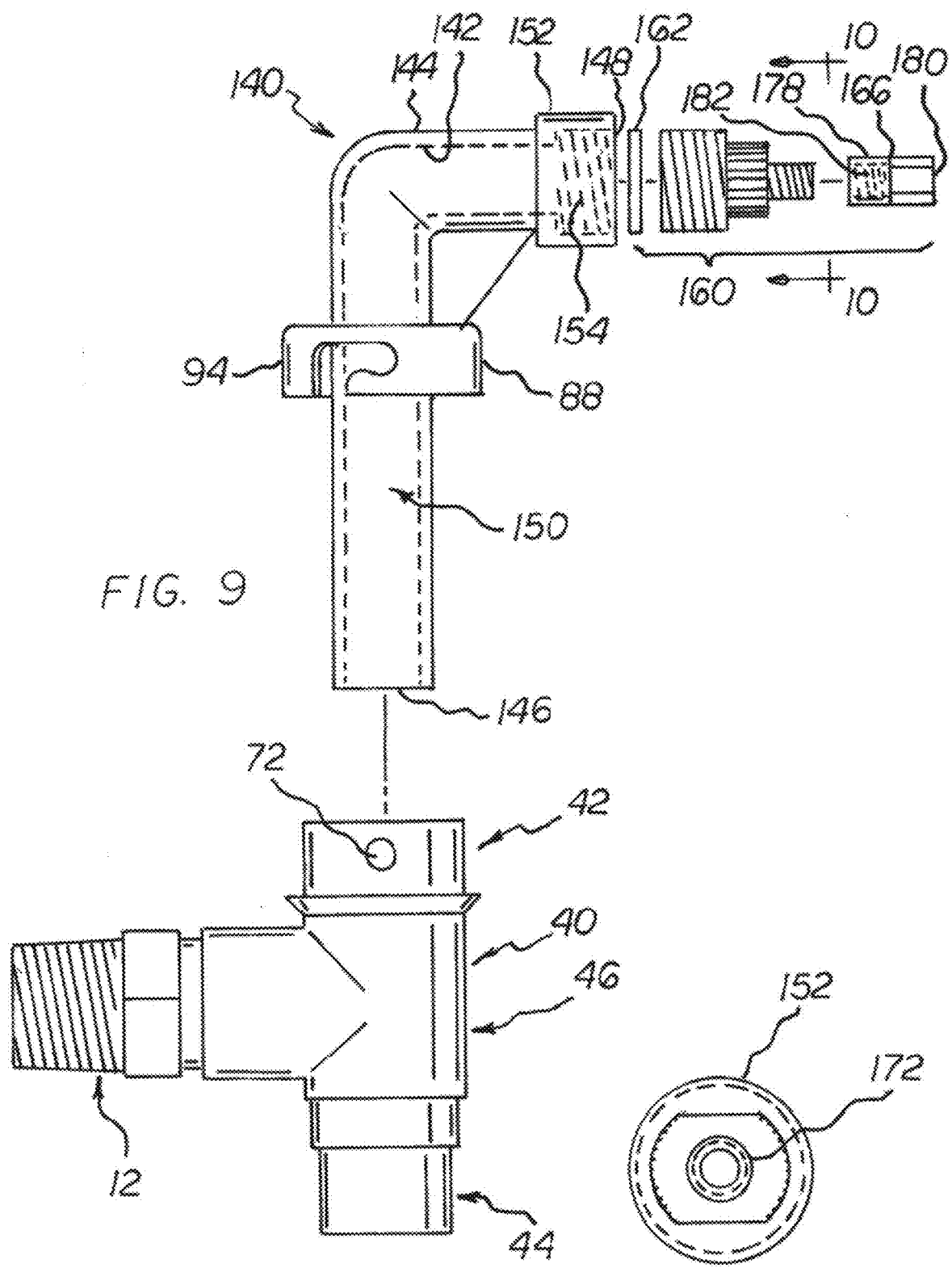
FIG. 9 is an exploded view of the flush configuration of the system.
FIG. 10 is a view taken along line 10-10 of FIG. 9.
Figure 13:
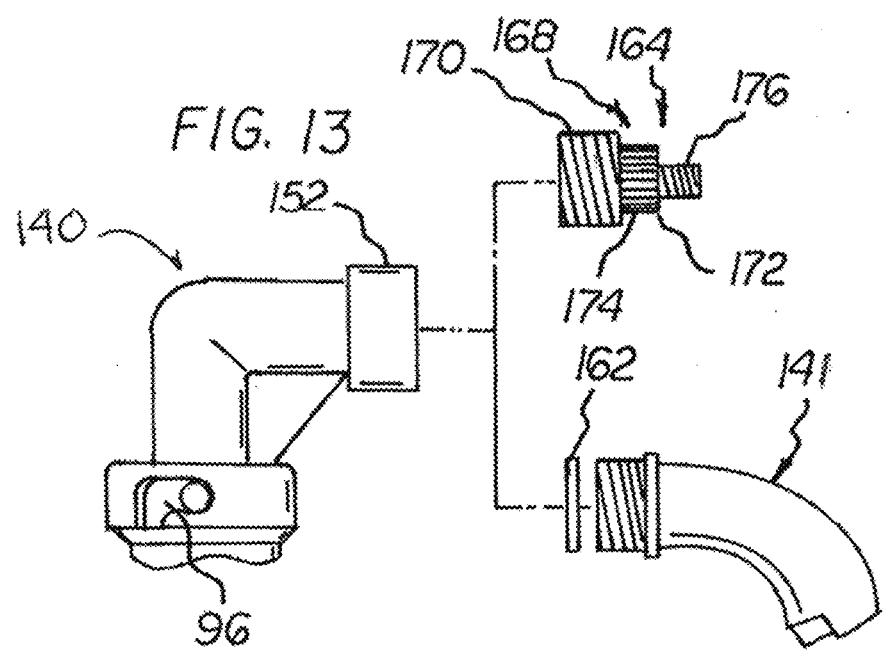
FIG. 13 is an exploded view of the flush component of the system with either a pressurized gas flush may be used or a garden hose water flush may be used.
Figure 14:
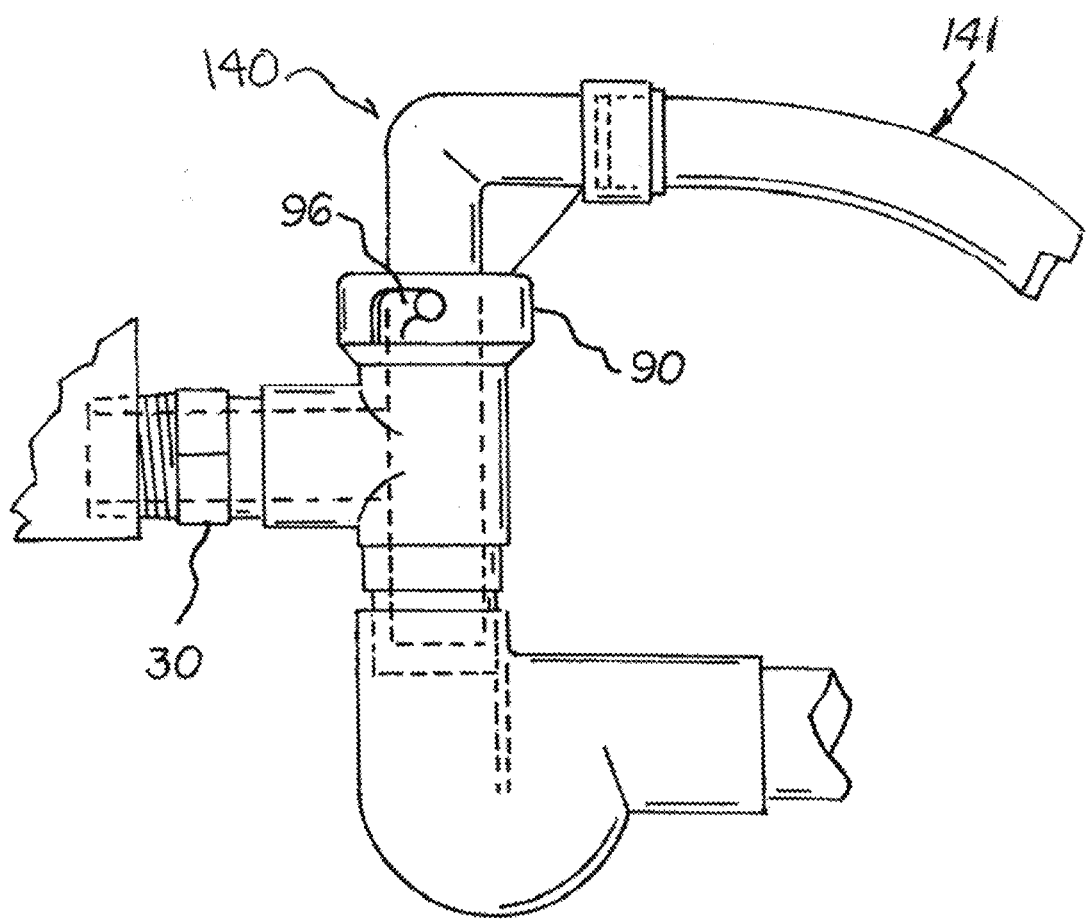
FIG. 14 is side elevational view of the system wherein a garden hose flush configuration is used along with a P-trap drain.
Figure 15:
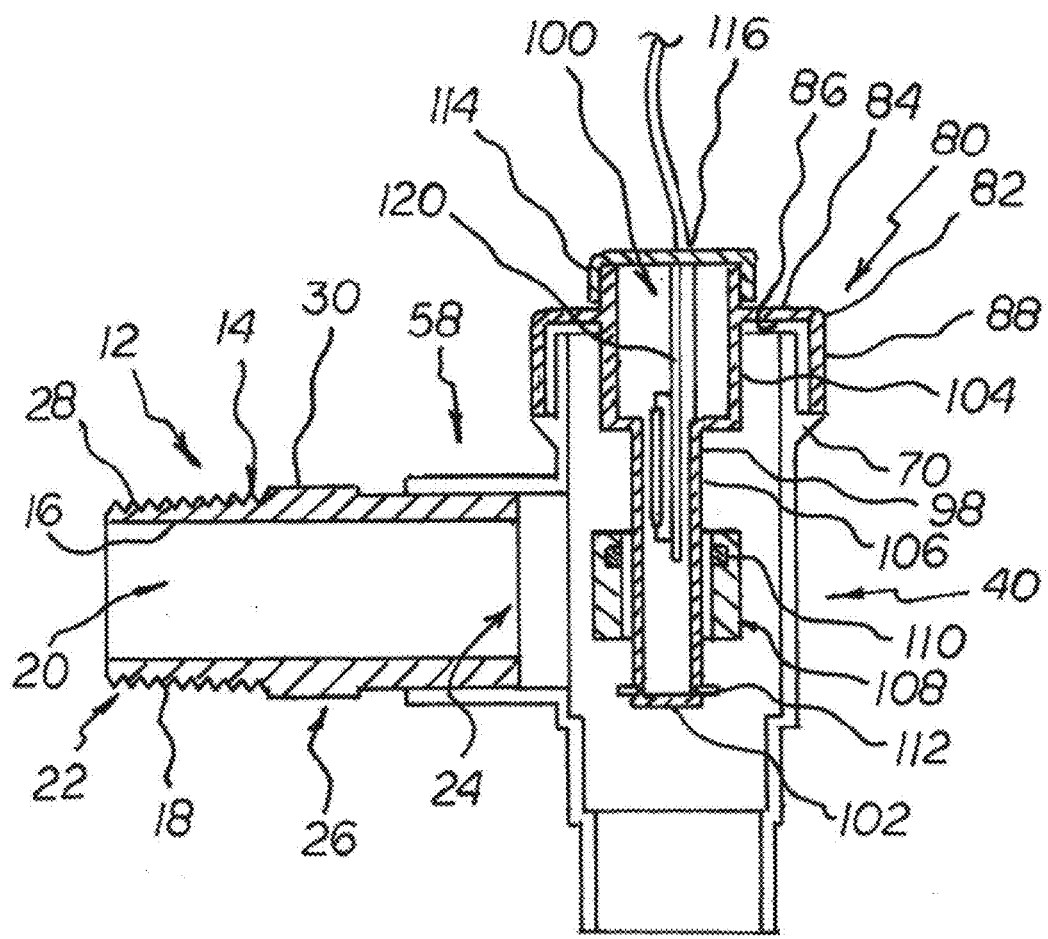
FIG. 15 is a cross sectional view of the shut off configuration.

With reference now to the drawings, and in particular to FIG. 1 thereof, the preferred embodiment of the new and improved air conditioner shutoff switch and flush system embodying the principles and concepts of the present invention and generally designated by the reference numeral 10 will be described.

The present invention, the air conditioner shutoff switch and flush system 10 is comprised of a plurality of components. Such components in their broadest context include an inflow tube, a main body, a cap and an electronic component. Such components are individually configured and correlated with respect to each other so as to attain the desired objective.

An air conditioner shutoff switch and flush system 10 comprising several components, in combination.

There is an inflow tube 12. The inflow tube is fabricated of a rigid material such as a plastic or metal. The inflow tube has a circumferential wall 14 with an inner surface 16 and an outer surface 18. The inner surface of the inflow tube forms a passageway 20 through the inflow tube.

The inflow tube has a proximal end 22 and a distal end 24, with a length 26 there between. The proximal end of the inflow tube is threaded 28 and the length of the inflow tube has a hexagonal configuration 30 The proximal end of the inflow tube has a first external diameter.

There is a main body 40. The main body is fabricated of a rigid material such as plastic or metal. The main body has an upper end 42 and a lower end 44, with a length 46 there between. The main body has an internal surface 48 and an external surface 50 with a thickness there between.

The internal surface of the main body forms a through-housing chamber 52 therein. The through-housing chamber has an open upper extent 54 and an open lower extent 56. The open lower extent of the through-housing chamber of the main body has an internal diameter.

The length of the main body has an outwardly projecting intake tube 58. The intake tube of the main body has a proximal end 60 and a distal end 62, with a length there between. The intake tube of the main body has an internal surface 64 and an external surface 66, with a thickness there between.

The external surface comprises a round surface. The internal surface of the main body intake tube has a first internal diameter, with the first internal diameter of the intake tube of the main body being greater than the first external diameter of the distal end of the inflow tube, thereby allowing the distal end of the inflow tube to be slidably received into the proximal end of the intake tube of the main body.

The upper end of the main body has a cap receiving portion 68. The cap receiving portion has an uppermost opening into the main body. The cap receiving portion of the upper end of the main body has an external flange 70. The external surface of the main body cap receiving portion has at least one locking lug 72 projecting there from.

There is a cap 80. The cap is fabricated of a rigid material, such as plastic or metal. The cap has a top extent 82 with an external surface 84 and an internal surface 86, with a thickness there between. The cap has a downwardly projecting side wall 88. The downwardly projecting side wall of the cap has an internal surface 92 and an external surface 94, with a thickness there between. The downwardly projecting side wall of the cap has at least one locking lug slot 96 there through. The at least one locking lug slot is configured to rotatably receive the at least one locking lug of the upper end of the main body.

The cap has a downwardly disposed closed end tube 98. The downwardly disposed closed end tube has a stepped configuration with an open uppermost extent 100 and a closed lowermost extent 102. The downwardly disposed closed end tube is operatively coupled to the cap.

The downwardly disposed closed end tube of the top extent of the cap has a upper section 104 having a second external diameter. The downwardly disposed closed end tube of the top extent of the cap has a lower section 106 having a third external diameter. The second external diameter is greater than the third external diameter.

The lower section of the downwardly disposed closed end tube of the top extent of the cap has an associated slideable float 108 located there around. The slideable float has an internal position indicator 110. The lower section of the downwardly disposed passageway of the top extent of the cap has a lowermost extent with an associated float keeper 112.

The upper section of the downwardly disposed closed end tube has a top plug 114 with a wire hole 116 there through, the plug being coupled to the cap, so as to allow the circuitry to be placed in the downwardly disposed closed end tube.

There is an electronic end piece 120. The electronic end piece has a circuit portion 122 coupled electronically to a wire 124. The wire passes from the circuit portion through the end piece. The circuit portion has a float position sensing component. The electronic end piece is coupled to the cap top extent. The circuit portion of the electronic end piece is housed within the downwardly disposed closed end tube of the top extent of the cap.

In a variation of the invention, there may be a solid seal cap 130 utilized to close off the top of the main body. In this configuration, there is no electronic circuit employed.

There is a flush pipe 140. In a variation, a garden hose 141 may be operatively coupled to the flush pipe. The flush pipe is fabricated of a rigid material, such as plastic or metal. The flush pipe has an internal surface 142 with a second internal diameter and an external surface 144 with a fourth external diameter.

The flush pipe has an open lower extent 146 and an open upper extent 148. The flush pipe has a passageway 150 running there through, from the open upper extent to the open lower extent. The flush pipe lower extent has an external diameter which is less than the internal diameter of the open lower extent of the through-housing chamber of the main body so that the flush pipe lower extent is slideably fit into the open lower extent of the through-housing chamber of the main body internal diameter. This configuration seals off the flush pipe from the main body, thereby allowing pressurized gas or liquid to be forced downward through the drain system of the air conditioner unit.

The flush pipe upper extent has a collar 152 with a third internal diameter female thread 154. The third internal diameter is greater than the second internal diameter. The flush pipe is removeably coupled to the cap, which allows the cap to be coupled to the downwardly disposed closed end tube or the flush pipe.

There is a pressure fitting 160. The pressure fitting has an o-ring 162, a connector 164, and an end seal 166. The connector has a stepped configuration 168 with a distal threaded portion 170. The distal threaded portion of the connector has a thread with a fifth external diameter. The fifth external diameter male thread of the connector is less than the third internal diameter of the flush pipe. The fifth external diameter male thread of the connector is sized to be threadedly mated with, and received by, the third internal diameter female thread of the collar of the upper extent of the flush pipe.

The connector has a proximal portion 172 and an intermediate portion 174. The proximal portion has an external male thread 176. The external male thread of the proximal portion of the connector has a sixth external diameter. The intermediate portion is continuous with the proximal portion of the connector and the distal portion of the connector. The sixth external diameter male thread of the proximal portion is less than fifth external diameter male thread of the distal portion of the connector.

The pressure fitting end seal has a distal portion 178 and a proximal portion 180. The distal portion of the pressure fitting end seal has a fourth internal diameter with a female thread 182. The fourth internal diameter is greater than the sixth external diameter of the connector proximal portion. The proximal portion of the pressure fitting end seal is closed. The pressure fitting is removeably coupled to the flush pipe.

Lastly, there is a flush container 190. The flush container has an internal compartment 192. The flush container has a valve portion 194 and a containment portion 196. The valve portion has an open and close valve 198. The valve portion has a distal portion 200, with the distal portion having a passageway 202 there through.

The passageway of the valve portion of the flush container is continuous with the containment portion chamber. The distal portion of the valve portion has a female thread 204. The valve portion has a proximal portion and an intermediate portion. The female thread of the distal portion of the valve portion of the flush container has the fourth internal diameter with a female thread thereby allowing the valve portion of the flush container to be threadedly mated with and received by the male thread of the proximal portion of the connector.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An air conditioner shutoff switch and flush system comprising, in combination:
   an inflow tube having a circumferential wall with an inner surface and an outer surface with the inner surface forming a passageway through the inflow tube;
   a main body having an upper end and a lower end with a length there between, the main body having an internal surface and an external surface with a thickness there between, the internal surface of the main body forming a through-housing chamber therein, the through-housing chamber having an open upper extent and an open lower extent, the length of the main body having an outwardly projecting intake tube, the intake tube of the main body having a proximal end and a distal end with a length there between, the intake tube of the main body having an internal surface and an external surface with a thickness there between, the external surface of the intake tube of the main body comprising a round surface, the main body coupled to the inflow tube;

a cap having a top extent with an external surface and an internal surface with a thickness there between, the cap top extent having a tube hole there through, the cap having a downwardly projecting side wall, the downwardly projecting side wall of the cap having an internal surface and an external surface with a thickness there between, the cap being coupled to the main body;

a downwardly disposed closed end tube having an open uppermost extent and a closed lowermost extent, the downwardly disposed closed end tube being operatively coupled to the cap top extent tube hole, the top extent of the cap having an internal surface and an external surface with a thickness there between;

an electronic end piece having a circuit portion coupled electronically to a wire, the wire passing from the circuit portion through the end piece, the circuit portion having a float position sensing component, the electronic end piece being coupled to the cap top extent with the circuit portion of the electronic end piece being housed within the downwardly disposed closed end tube of the top extent of the cap;

a flush pipe having an internal surface and an external surface, the flush pipe having an open lower extent and an open upper extent, the flush pipe having a passageway running there through from the open upper extent of the flush pipe to the open lower extent of the flush pipe, the flush pipe being coupled to the cap;

a pressure fitting having an o-ring and a connector and an end seal, the pressure fitting being coupled to the flush pipe; and a flush container having an internal compartment, the flush container having a valve portion and a containment portion, the containment portion having a chamber therein, the valve portion having an open and close valve, the valve portion having a distal portion with the distal portion having a passageway there through, the passageway of the valve portion of the flush container being continuous with the containment portion chamber, the flush container being coupled to the flush pipe.

2. The air conditioner shutoff switch and flush system as described in claim 1, with the system further comprising:
the downwardly disposed closed end tube having a stepped configuration; and
the connector having a stepped configuration with a distal threaded portion.

3. The air conditioner shutoff switch and flush system as described in claim 2, with the system further comprising:
the internal surface of the main body intake tube having a first internal diameter;
the flush pipe internal surface having a second internal diameter;
the distal end of the inflow tube having a first external diameter;
the downwardly disposed closed end tube of the top extent of the cap having an upper section having a second external diameter and a lower section having a third external diameter with the second external diameter being greater than the third external diameter; and
the flush pipe external surface having a fourth external diameter.

4. The air conditioner shutoff switch and flush system as described in claim 3, with the system further comprising:
the inflow tube having a proximal end and a distal end with a length there between, the length of the inflow tube having a hexagonal configuration;
the lower section of the downwardly disposed closed end tube of the top extent of the cap having an associated slidable float located there around, the lower section of the downwardly disposed passageway of the top extent of the cap having a lowermost extent with an associated float keeper;
the distal portion of the connector having a fifth external diameter male thread, the connector having a proximal portion and an intermediate portion, the proximal portion having an external male thread having a sixth external diameter, the intermediate portion being continuous with the proximal portion of the connector and the distal portion of the connector, the sixth external diameter male thread of the proximal portion being less than the fifth external diameter male thread of the distal portion of the connector.

5. The air conditioner shutoff switch and flush system as described in claim 4, with the system further comprising:
the first internal diameter of the intake tube of the main body being greater than the first external diameter of the distal end of the inflow tube thereby allowing the distal end of the inflow tube to be slidably received into the proximal end of the intake tube of the main body;
the flush pipe upper extent having a collar with a third internal diameter female thread, the third internal diameter female thread being greater than the second internal diameter; and
the fifth external diameter male thread of the distal portion of the connector being sized to be threadedly mated with and received by the third internal diameter female thread of the collar of the upper extent of the flush pipe, the fifth external diameter male thread of the connector being less than the third internal female thread diameter of the flush pipe.

6. The air conditioner shutoff switch and flush system as described in claim 5, with the system further comprising:
the upper end of the main body having a cap receiving portion having an uppermost opening into the main body; and
the pressure fitting end seal having a distal portion and a proximal portion, the distal portion of the pressure fitting end seal having a fourth internal diameter female thread, the fourth internal diameter female thread being greater than the sixth external diameter of the connector proximal portion.

7. The air conditioner shutoff switch and flush system as described in claim 6, with the system further comprising:
the cap receiving portion of the upper end of the main body having an external flange;
the slidable float having an internal position indicator; and
the proximal portion of the pressure fitting end seal being closed.

8. The air conditioner shutoff switch and flush system as described in claim 7, with the system further comprising:
the external surface of the main body cap receiving portion having at least on locking lug projecting there from;

the downwardly projecting side wall of the cap having at least one locking lug slot there through with the at least one locking lug slot being configured to rotatably receive the at least one locking lug of the upper end of the main body; and the distal portion of the valve portion having a female thread having the proximal portion and an intermediate portion, the proximal portion having the fourth internal diameter with a female thread thereby allowing the valve portion of the flush container to be threadedly mated with and received by the male thread of the proximal portion of the connector.

9. The air conditioner shutoff switch and flush system as described in claim 8, with the system further comprising:

the inflow tube being fabricated of a rigid material;

the main body being fabricated of a rigid material;

the cap being fabricated of a rigid material; and the flush pipe being fabricated of a rigid material.

10. An air conditioner shutoff switch and flush system comprising, in combination:

an inflow tube having a passageway through the inflow tube;

a main body having an internal surface which forms a through-housing chamber therein, the through-housing chamber having an open upper extent and an open lower extent, the main body having an outwardly projecting intake tube, the intake tube of the main body having an external surface, the external surface of the intake tube of the main body comprising a round surface, the main body being coupled to the inflow tube;

a cap having a tube hole there through, the cap being coupled to the main body;

a downwardly disposed closed end tube having an open uppermost extent and a closed lowermost extent, the downwardly disposed closed end tube being operatively coupled to the cap tube hole;

the downwardly projecting side wall of the cap having at least one locking lug slot there through with an at least one locking lug slot being configured to rotatably receive the at least one locking lug of the upper end of the main body;

a float being slidably coupled to the downwardly disposed closed end tube;

an electronic end piece having a circuit portion coupled electronically to a wire, the wire passing from the circuit portion through the end piece, the circuit portion having a float position sensing component, the electronic end piece being coupled to the cap top extent with the circuit portion of the electronic end piece being housed within the downwardly disposed closed end tube of the top extent of the cap;

a flush having a passageway running there through with the flush pipe being removeably coupled to the cap;

a pressure fitting having an o-ring and a connector and an end seal, the pressure fitting being operatively coupled to the flush pipe; and a flush container having a valve portion and a containment portion, the containment portion having a chamber therein, the flush container being removeably coupled to the pressure fitting.

\* \* \* \* \*